United States Patent [19]

Gabillet

[11] Patent Number: 4,846,625

[45] Date of Patent: Jul. 11, 1989

[54] DEVICE FOR TRANSFERRING OBJECTS, PARTICULARLY GLASS PANES

[75] Inventor: Maurice Gabillet, Boulogne Billancourt, France

[73] Assignee: Societe Generale Pour Les Techniques Nouvelles S.G.N., France

[21] Appl. No.: 38,287

[22] Filed: Apr. 14, 1987

[30] Foreign Application Priority Data

Apr. 18, 1986 [FR] France ............... 86 05656

[51] Int. Cl.⁴ ............................................ B66C 1/02
[52] U.S. Cl. ................................. 414/737; 414/752; 414/728; 414/798.5; 414/736; 271/102
[58] Field of Search .............. 414/107, 110, 736, 737, 414/749–752, 330, 728, 783; 271/102, 177, 180, 181; 294/64.2

[56] References Cited

U.S. PATENT DOCUMENTS

| 3,178,041 | 4/1965 | Wheat | 414/107 |
|---|---|---|---|
| 3,598,263 | 8/1971 | Ehmke | 414/736 X |
| 3,679,076 | 7/1972 | Miller et al. | 414/752 X |
| 3,690,477 | 9/1972 | Nilsson | 414/330 |
| 4,018,342 | 4/1977 | Cuniberti et al. | 414/737 |
| 4,073,602 | 2/1978 | Cagle | 294/64.2 |
| 4,093,083 | 6/1978 | Klaus | 414/107 |
| 4,165,808 | 8/1979 | Stumpf | 414/736 |
| 4,202,228 | 5/1980 | Goransson | 414/737 X |
| 4,444,537 | 4/1984 | Werner | 414/737 X |
| 4,566,846 | 1/1986 | Cartwright | 414/737 X |
| 4,604,026 | 8/1986 | Barrett | 414/737 X |

FOREIGN PATENT DOCUMENTS

| 217,180 | 4/1987 | Grenzebach | 414/737 |
|---|---|---|---|
| 0012081 | 6/1980 | European Pat. Off. | |
| 2516884 | 10/1976 | Fed. Rep. of Germany | |
| 2613322 | 4/1978 | Fed. Rep. of Germany | |
| 252078 | 12/1985 | Japan | 414/737 |
| 6701507 | 8/1968 | Netherlands | 414/737 |
| 706299 | 1/1980 | U.S.S.R. | 414/107 |

Primary Examiner—Robert J. Spar
Assistant Examiner—William M. Hienz
Attorney, Agent, or Firm—Marshall & Melhorn

[57] ABSTRACT

This invention relates to a device for transferring objects from a gripping station to a depositing station, and is particularly applicable to the loading or unloading of panes of glass. The device includes at least one arm mounted perpendicularly to a shaft which drives it in rotation, with the arm being adapted to slide perpendicularly relative to the shaft. Gripping devices such as suction cups are mounted at each end of the arm, and a motor and indexer are provided for automatically controlling the rotation of the shaft, the sliding and locking of the arm, and the maneuvering of the gripping devices.

8 Claims, 2 Drawing Sheets

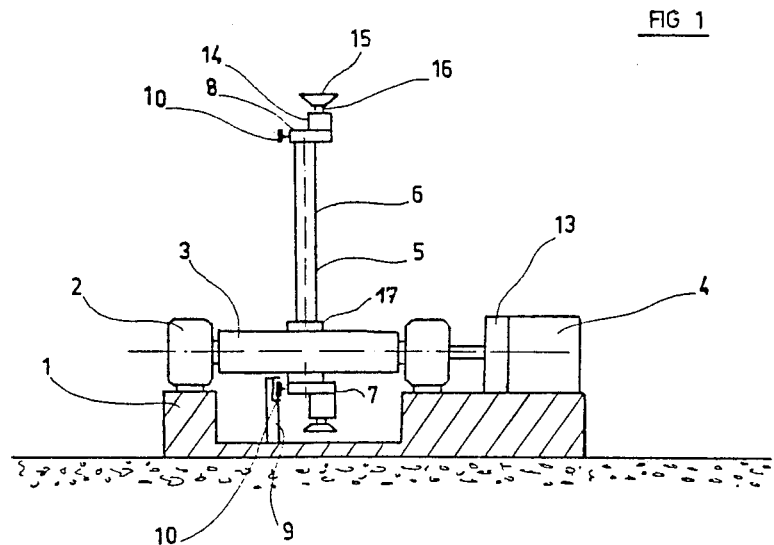
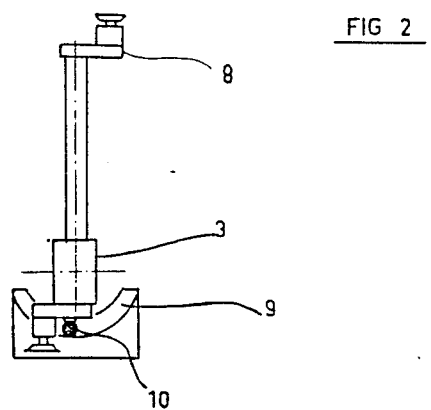
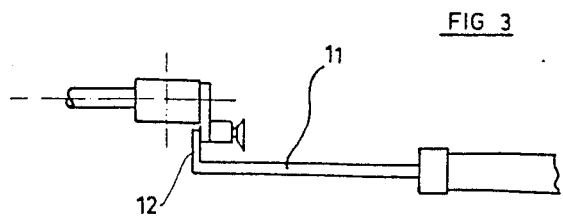

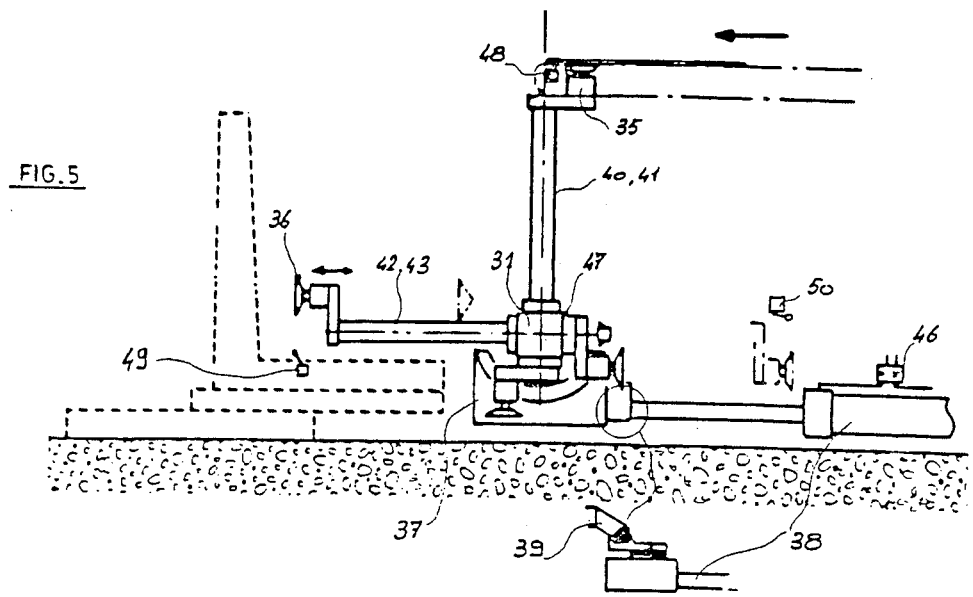
FIG. 5
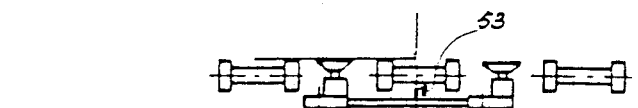
FIG 4
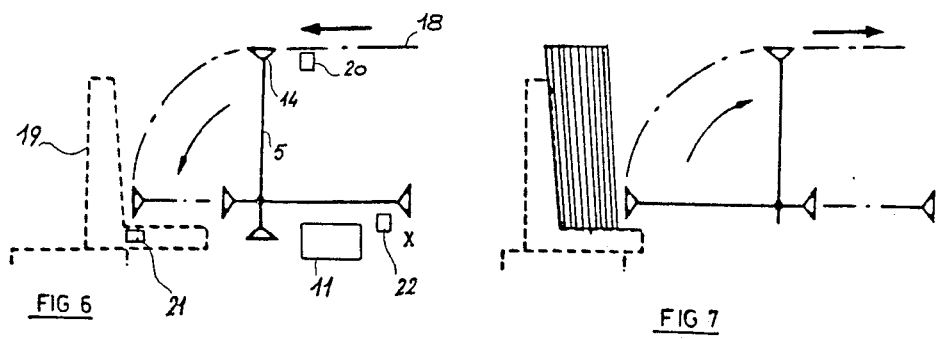
FIG 6
FIG 7

DEVICE FOR TRANSFERRING OBJECTS, PARTICULARLY GLASS PANES

BACKGROUND OF THE INVENTION

1. Field of the Invention

This present invention relates to a device for transferring objects, particularly for the loading or unloading of panes of glass.

The term "transfer" is understood to mean the operation consisting in gripping or picking up the object at a so-called gripping station and depositing it at a so-called depositing station.

"Loading" and "unloading" are understood to mean the transfer of the objects, in particular of plate elements or panes, from a gripping station to a depositing station, the objects (plates) passing from a substantially horizontal position at the gripping station to a substantially vertical position at the depositing station (so-called loading operation) or, inversely, from a substantially vertical position to a substantially horizontal position (unloading).

The device forming the subject matter of the invention was firstly created to solve the problem of loading and unloading panes of glass. In the production of flat glass, a continuous sheet or ribbon of glass emerges from the glass production unit (in accordance with the float glass process, for example), and the ribbon is then cut into individual panes. The sheet and the panes cut therefrom are carried by conveyors along a generally horizontal path, with the conveyor carring the sheet being known as the principal conveying lines. These panes are then stored on handling tracts or bucks provided with a desk or stand on which the panes are supported on edge in abutting vertical position. These panes may then be subsequently removed for further cutting to desired patterns.

The problem which is raised is that of transferring the panes from the horizontal cutting position to the vertical storage position, and vice versa.

2. Description of the Prior Art

Up to the present time, the problem of loading has been solved by means of devices of the type described in French Pat. No. 69 03391, corresponding to U.S. Pat. No. 3,679,0734. This device is composed of a system with conveyor rollers which transfer the pane from the end of the conveying line to the gripping station, and of a loading system which grips the horizontal pane and deposits it in vertical position on a desk. The loading system is designed with two parallel planes connected together by an articulated device incorporating two cross-pieces. The lower plane is constituted by two arms fixed to a shaft itself being adapted to be driven in rotation. The upper plane is constituted by two arms parallel to the lower arms and bearing suction cups.

Initially, the articulated system of the device is folded, the arms being disposed perpendicularly to the direction of displacement of the glass. The pane arriving at the end of the conveying line passes over the conveyer rollers which guide it to the gripping station, i.e. the pane abuts on the suction cups by two of its parallel sides. The arrival of the pane at the end of the gripping station acts on a contact placing the suction cups under depression. The system then tips so as to bring the pane into vertical position. Operation of the articulated system incorporating crosspieces allows the pane to be deposited at the spot designated.

Another device used heretofore is the one described in French Pat. No. 82 06604 for transferring a plate in vertical position towards a conveying line on which the plate will be in horizontal position. This operation is effected by means of a mobile gantry provided with a beam to which are fixed arms carrying suction cups at their ends. In this way, the plate is gripped on its truck in vertical position by means of the suction cups placed under depression. The gantry moves to bring the plate on a chassis pivoting in substantially inclined position. The chassis tips, and the plate is then in horizontal position and may be transferred onto the conveyor belt without difficulty. In order to increase the unloading rates, the Patent provides a rotation of 90° of the beam bearing the arms, with the result that the arms in horizontal position do not hinder pivoting of the chassis, the operations of pivoting and return of the gantry into initial position then taking place simultaneously.

This state of the art reveals the necessity of a system of the pivoting support type for loading or unloading plates. The use of such a device leads to the question of its bulk in the workshop.

Until recently, the continuous sheet of glass leaving the production unit was cut across its entire width of about 140 inches (3.50 m) into a single pane 140 inches wide and of a predetermined length L, with the results that the positioning of one pivoting support at the end r at the side of the conveyer did not raise great difficulties. The panes thus stored on desks were transferred to cutting areas located outside the production unit for further cutting into panes of the desired length.

At the present time, in order to increase the rate of production of plates, the sheet of glass is directly cut out on the principal conveying line in both the longitudinal direction and in the transverse direction so as to obtain the panes of desired dimensions directly. In this way, several rows of panes advance on the conveying line, with the result that several panes arrive simultaneously at the gripping station.

It will be appreciated that the dimensions in length and in width of the loading devices in that case becomes a problem. The solution consists in spacing the loading devices and in using conveyor rollers of different lengths on each row in order to conduct the panes to the gripping stations (one station per row). Furthermore, the principal conveying line is located at about 51 inches (1.3 m) from the ground, which leaves too small a space in height for installing pivoting supports. Moveover, the devices used at the present time ensure in the best of cases rates of 4 second per cycle (per plate every 4 seconds), this still proving in practice to be insufficient.

SUMMARY OF THE INVENTION

The device forming the subject matter of the invention makes it possible to have rates at least equal to those of the devices of the prior art, and it is envisaged to obtain rates of between 2 and 4 seconds per cycle (rapid transfer). In order firstly to avoid the drawback of lack of space and secondly to increase the rapidity of execution of the loading/unloading operations. Applicant has developed the device forming the subject matter of the invention.

This device, which is particularly advantageous for loading or unloading panes, is generally suitable for transfer of any objects from one station to another, the device being adaptable by the user to the desired industrial application depending on the situation of the stations and the objects to be handled, as will be shown by the following description.

The device according to the invention comprises at least one arm mounted perpendicularly to a shaft which drives it in rotation, the arm being adapted to slide perpendicularly to the shaft.

Gripping means are mounted at the opposite ends of the arm, and means are provided for automatically controlling the rotation of the shaft, the slide and locking of the arm, and the maneuvering of the gripping means.

Although the device according to the invention may comprise only one arm, it is preferable to use a device comprising at least two coupled arms, and it is such a device which will be described and illustrated hereinafter.

BRIEF DESCRIPTION OF THE DRAWINGS

The invention will be more readily understood on reading the following description with reference to the accompanying drawings, in which:

FIG. 1 shows a schematic view of the device as viewed longitudinally or along the direction of displacement of the glass;

FIG. 2 is a schematic view in a directions transverse or perpendicular to the displacement of the glass, essentially showing the slide for locking the arms;

FIG. 3 particularly shows the large-stroke jack and the slide of the arm;

FIG. 4 shows an advantageous embodiment constituted by two coupled pairs of orthogonal arms viewed in a longitudinal direction;

FIG. 5 shows the same device in a transverse direction; and

FIG. 6 and 7 schematically show the operation of the device.

DESCRIPTION OF THE PREFERRED EMBODIMENT

Referring now to the drawings, the device forming the subject matter of the invention comprises a frame 1 (FIG. 1) on which are mounted bearings 2. Between these bearings is located a shaft 3 driven in rotation by a gear motor 4. The means for controlling the sequences of stop and of rotation of the shaft are of a conventional type well known by those having ordinary skill in the art.

One advantageous mechanical device is an indexer mounted between the gear motor and the shaft as shown in FIG. 1 under reference 13. Such indexers are of conventional construction and may readily be selected by those skilled in the art in accordance with the requirements of the application as to rates, number of stations to be served, and situation of these stations with respect to one another.

The shaft 3 supports arms (one or more) 5 driving them in rotation. Arm 5 is formed by a metallic cylinder 6 and is mounted perpendicularly to shaft 3. The arm may slide perpendicularly relative to the shaft up to two stops, one fixed in the vicinity of each end of the arm 5. Advantageously, these stops are constituted by plates 7 and 8 disposed at the ends of the cylinder 6 (FIGS. 2 and 3) or by bearings 17 mounted on the shaft and the arm (FIG. 1). However, any other device acting as a stop placed in the vicinity of the end would be suitable.

The arm 5 is locked in its extreme position, more particularly in its vertical position, by an arm locking system. A simple system is constituted by a slide 9 (FIG. 2) which guides a roller 10 mounted at each of the ends of the arm. The slide 9 affixed to the frame is placed so as to be merged with the path of the roller located on the arm of shortest length, generated by the rotation of the shaft. Other devices may be just as suitable, for example a pin system or any other means known to the person of ordinary skill in the art.

The arm 5 may slide in the shaft 3 inside a space made in this shaft, and in a direction perpendicular to the axis of rotation. According to another variant, the arm 5 may be adjacent the shaft 3, the arm thus lying outside the shaft.

Sliding of the arm 5 is obtained by the action of sliding means disposed so as to act on the arm present at the depositing station. This may, for example, be a so-called large-stroke jack or cylinder 11 (FIG. 3), fastened to the frame, and disposed in a direction parallel to the axis of the metallic cylinder 6 at the depositing station, and on the side opposite the largest length of the same cylinder 6 with respect to a plane perpendicular to the cylinder and passing through the axis of the shaft 3.

According to FIG. 3, this large-stroke jack 11 is provided at its end with a hooking system 12 which comes into contact with the arm 5 when the jack is pushed up to the level of the arm, then maintains the contact when the jack is retracted, thus causing the arm to slide in a horizontal plane. Simple rotation of the shaft 3 then disengages the retracted arm 5. A simple hooking system may, for example, comprised a trigger device or a rod adapted to rise or fall, controlled by an electro-magnet.

The number and arrangement of the arms will be discussed hereinbelow. Each of the arms 5 is equipped at each of its ends with at least one gripping means 14. Where plate 7 and 8 exist, the gripping means are installed thereon. This advantageous arrangement makes it possible to modify fairly easily the point of grip on the object (the spot where it is gripped) by modifying the location of the gripping means with respect to the object, and it also enables gripping means possibly to be added on the same arm.

Particularly advantageous gripping means are constituted by undeformable suction cups 15 placed under depression as by an ejector (not shown). Such gripping means are advantageous for handling products in the form of plates. They may be used in general when the surface state is suitable (virtually no roughness).

Other gripping devices may be adapted depending on the material to be handled. For example, the gripping device may be a "gripping hand" as described in French Pat. No. 78 21554, corresponding to U.S. Pat. No. 4,294,424, in which the shape of the hand is adapted to the object taken, gripping clamps, etc. In general, any gripping means adapted to be mounted on the arm can be used. Such conventional means may be readily selected by those of ordinary skill in the art as a function of the object to be handled, i.e. its shape, material, etc.

Preferably, and in particular when the objects are fragile, the gripping means 15 are mounted on short-stroke jacks or cylinders 16, with the result that the contact between the object to be gripped and the gripping means 15 is obtained precisely and gently by action of the jack 16.

This short-stroke jack 16 has two other additional functions when panes of glass are being handled. At loading, the withdrawal of the jack 16 after gripping of the pane leads the lower side of the pane to describe a curve of smaller radius upon rotation of the arm; thus are avoided the risks of scratches by the displacement of the lower side of the plane which arrives at the depositing station on the pane which was previously deposited on the desk. At unloading, maneuver of the jack 16 immediately after grip of the pane on the pile against the desk and during the time of stop of the arm, makes it possible to detach the pane from the pile.

The short-stroke jack 16 is connected to the compressed air network. It is possible to place an ejector (not shown) before jack 16; this same ejector may be used for placing the suction cups 15 under depression when they are used.

The air circuit (not shown) passes inside the arms 5 and is supplied only when the arms 5 are in extreme position. It will be readily imagined that this circuit is divided into two parts on each arm, each part supplying the gripping means located on the arm on the same side with respect to the shaft 3. In this way, the same circuit may serve to supply the gripping means located on parallel arms on the same side of the shaft. This astute arrangement of the control fluid conduits makes it possible to avoid fatigue of the pipes and "nodes".

The automatic control means also comprise:
at least one sensor for detecting the presence of objects at the gripping station,
at least one sensor for ensuring that the depositing station is available,
at least one sensor detecting the position (retracted or extended) of the arm 5 on the side opposite the depositing station with respect to the shaft 3 and/or on the side of the depositing station so as to stop the device if slide of the arm does not take place.
at least one sensor verifying the position of the shaft 3.

The information obtained at the sensors is sent to a programmable automat or computer which, provided with the appropriate software, manages the operation of the device (sequences of rotation of the shaft, slide, maneuver of the gripping means) and the movements of the storage units present in the depositing station (truck, conveyor).

The device which has just been described may comprise one or more arms arranged in various manners, depending on the desired application.

A plurality of arms may be mounted in parallel on the same shaft, when for example the length of the object to be gripped is such that it is necessary to grip it at several spots. Another case is the one where a plurality of rows of objects arrive at the same moment on the same conveyor, one arm (or a group of arms) being charged with gripping the objects on one row, the number of arms or groups of arms being defined by the number of rows.

In this latter arrangement, it is advisable to connect arms together by one (or more) distance pieces or struts, to ensure a complementary fastening or securing of the arms one to another. It is then advantageous to use as the arm locking system a slide 9 guiding a roller 10, wherein the roller is mounted in the middle of the strut or distance piece, so that the slide will be placed in an adequate manner. One roller is thus mounted for two arms instead of one per arm, and one slide instead of two, thus simplifying the device.

Moreover, it is possible to install gripping means on this strut or distance piece, placed sufficiently near the end of the arms that it connects with the object to be gripped. This arrangement is contemplated in the aforestated expression "gripping means mounted at each end of each of the arms".

In this embodiment, the shaft has a variable length. There is no interest in increasing its length too much. For large installations comprising a plurality of very close rows on which the objects arrive simultaneously, it is preferred to use several modules of said device, each module comprising a reasonable number of arms, with a gear motor operating the assembly or part of the modules.

Such devices presenting the features of the invention are advantageously used wherever problems of dimensions or lack of space are encountered, since the slide of the arms allows then to be utilized in areas having only a portion of the space otherwise required.

According to a particular embodiment of the present invention, the rates of movement from a gripping to a depositing station are high. By multiplying the number of arms distributed around the shaft in the immediate vicinity of one another, groups of arms are thus obtained.

It is particularly advantageous to operate with groups (one or more) of two so-called orthogonal arms—called couples of orthogonal arms—i.e. the arms make an angle of 90° with each other.

To understand the description, it has been assumed that the shaft 3 is horizontal. It may equally well be disposed vertically or in any other direction, the other features of the invention remaining unchanged. With a vertical-shaft device, the transfer of panes from one truck to another truck.

In this way, for every industrial application of the device according to the invention adapted with determination of the direction of the shaft, the number and arrangement of the arms, the number, nature and arrangement of the gripping means and adjustment of the automatic control, the transfer of objects, particularly panes of glass, from a gripping station to a depositing station, with the aid of the device forming the subject matter of the invention, takes place in accordance with the following operations carried out in the following order:
gripping of one object (or objects) at the gripping station by actuation of the or each gripping means fixed to the end of the arm or arms in place at this station.
rotation of the shaft through a predetermined angle to bring the arm or arms laden with the object or objects to the depositing station,
depositing of the object(s) by actuating the or each gripping means,
slide of the arm(s) having just deposited said object(s),
rotation of the shaft through a predetermined angle so as to take the arm(s) to the gripping station, and so on whenever an object (or a row of objects) is presented at the gripping station.

The description of the operation will be continued in FIGS. 6 and 7.

These FIGS. show an embodiment with two orthogonal arms transferring objects (panes for example) which arrive on the conveyor 18 horizontally to a storage desk or rack 19 where they are stored vertically. In these FIGS., the transfer will be explained for one arm only, then for two orthogonal arms, each arm being equipped with a gripping means gripping an object.

The arrival of the object at the gripping station (end of the conveyor 18) detected by the sensor 20 at this station triggers off, by the automatic control, the maneuver of the gripping means 14 mounted on the arm 5 present at this station.

After grip and authorization from the sensor detecting availability of the depositing station, rotation of the shaft 3 is controlled. Its speed and duration are regulated automatically.

When the arm 5 arrives at the depositing station (constituted here by desk 19), the shaft having rotated through a predetermined angle, its rotation stops. The gripping means is actuated. The object is deposited.

Automatic control then triggers off, if necessary, the maneuver of the storage units (in the FIGS., moving back of desk 19 for example) and the slide of arm 5 of the depositing station by action of the slide means 11 which takes the arm 5 along over a determined, constant length.

After authorization of the sensor 22 detecting the position of the arm (extended position in FIG. 6), rotation of the shaft is controlled to bring said arm to the gripping station. When the shaft has rotated through an angle B, rotation stops.

At each operation, the position of the shaft is verified and transmitted to the automatic control.

One cycle (one shaft rotation) has been described with one arm. The cycle is repeated for each object (or rows of objects) arriving at the gripping station.

The predetermined angle which defines the situation of the gripping and depositing stations with respect to each other is not necessarily equal to 90°, as shown in FIG. 6. Its value, therefore that of its supplementary angle, depends on the particular industrial application, on which the arm arrangement in turn depends.

When the device comprises only one or a plurality of arms all parallel to one another (i.e. distributed on the same longitudinal generatrix of the shaft), the predetermined angle may be equal to or different from 90°, and automatic control is in that case regulated accordingly. This arrangement, although it may be advantageous from the standpoint of dimensions, does not present a saving of time.

The device comprising one or more couples of orthogonal arms is preferable because of the high rates attainable. Its operation per arm is the one described hereinbefore. However, when one arm is at the gripping station, the other is at the depositing station gripping and depositing thus take place simultaneously, similarly to the rotations of the arms, the stopping time at each station being at least equal to the time necessary for depositing, to which is added the time necessary for sliding the arm to this station.

In order to minimize the operation time for rotation of the shaft, the movement is regulated as follows: deceleration when approaching the stations, acceleration between the stations and stop at the stations. The variation of the speeds of rotation of the shaft is obtained by action of the automatic control.

When the gripping means 14 are constituted by suction cups 15 (FIG. 1) mounted on short-stroke jacks 16 and connected to an ejector (not shown) supplied with compressed air, the object is gripped by insufflation of compressed air into the ejector of the arm 5 at the gripping station, providing depression of the suction cup (connected to the contraction of the ejector) and the extension of the short-stroke jack bring the suction cup which is connected thereto into contact with the object to be gripped.

The jack 16 and the suction cup may equally well be supplied by the same ejector.

Depositing of the object is simply effected by stopping the admission of compressed air into the ejector of the suction cup of the arm carrying the object.

All the gripping means mounted on parallel arms are actuated simultaneously, in the same way as when several gripping means are mounted at the same end of the same arm.

FIG. 7 schematically shows the unloading of objects (for example panes) from a desk towards a conveyor. The description of the operation made with reference to FIG. 6 is obviously applicable, rotation of the shaft being effected in opposite direction with respect to that indicated in FIG. 6.

The description of the device and its operation clearly show that the devices according to the invention present the following advantages:
  positioning in reduced spaces possible in as much as due to retraction of the arms, the portion of the space defined by a plane passing through the axis of an arm at the depositing station (this plane forming a predetermined angle with the axis of an arm at the gripping station), and on the side of the plane opposite the gripping station, is virtually unoccupied by the device,
  rapidity of execution or cycling because each arm end is provided with gripping means, and the slide of the arm to the depositing station makes it possible to save the time of rotation through the predetermined angle.

To illustrate the description, a machine for rapidly loading panes of glass according to the invention, as well as the operation thereof, will now be described.

The device (FIGS. 4 and 5) allows rapid loading of units of glass, called "primitives" or "blanks", which were cut out on the principal conveying line conveying the sheet of glass upon leaving the production unit. These blanks have the following dimensions:
  length: 600 to 1200 mm (23.6 to 47.2 inches)
  width: 400 to 600 mm (15.7 to 23.6 inches)
  thickness: 2 to 8 mm (0.078 to 0.315 inch)
In each row, the blanks have the same dimensions.
  The machine has the following characteristics:
  dimensions: 2120×2850 mm (83.5×112.2 inches)
  height of the gripping plane: 1290 mm (50.8 inches)
  mass: about 1000 kg (2200 pounds)
  necessary power: 3 kW
  rate: 2 seconds per cycle maximum, in any case 2 to 4 seconds per cycle.
  The blanks are loaded on desks mounted on storage trucks; maximum thickness of the piles: 475 mm (18.7 inches).
  The machine is constituted by :
  a horizontal shaft 31 controlled in rotation by an indexer 32 with four stations, itself driven by a gear motor 33;
  two couples of orthogonal arms (40, 42) and (41, 43) adapted to slide in the shaft 31 and mounted prependicularly to this shaft. The ends of these sliding arms are equipped with a short-stroke jack 35 bearing a suction cup 36 with a diameter of 150 mm (5.9 inches). A slide 37 fixed on the frame of the machine ensures locking of the arms in the proper position by rolling in said slide, the rollers being mounted on the struts or distance pieces 52;
  slide of the couples of arms (40, 42 and 41, 43) is controlled by a linear pneumatic jack 38 fixed on the frame of the machine. A trigger device 39 ensures hooking of the jack rod on the distance piece 52 connection the arms;

a source of compressed air (maximum 7 kg/cm$^2$–99.2 psi) feeds:

on the one hand, via a rotating joint 44 and a seat of cam controlled distributors 45, the jacks 35 and the ejectors whose function is to create the vacuum necessary in the suction cups;

on the other hand, the large-stroke jack 38 (for retracting the arms) via the distributor 46;

the air circuit passes inside the arms and is supplied only when the latter have stopped in extreme position (connection 47);

a desk connected to a programmable automat or computer allows automatic or sequence-by-sequence operation of the machine. The sensors necessary for operation and safety are placed either on the equipment, or in the vicinity thereof, in particular:

"presence of glass" detector 48 on the supply conveyor;

"desk in position of loading" sensor 49;

"retracted arm" safety sensor 50;

"indexer in standby position" sensor 51.

It should be noted that the cams for controlling the

Four types of sequences for a rotation of shaft 31 are distinguished:

Sequence 1:
gripping of a bland by extension of the jacks and employment of the ejector arms 40, 41,
depositing of a blank by extension of the jacks and stopping of the ejector of the arms 42, 43–slide of the arms 42, 43 by retraction of the large-stroke jack 38 in contact with the distance piece 52 by its hooking device 39.

Sequence 2:
rotation of the shaft 31 through 90°, taking the arms 40, 41 to the depositing station and the arms 42, 43 to the gripping station—the jacks 35 of the arms 40, 41 retracting during rotation.

Sequence 3:
depositing of a blank by the arms 40, 41 and slide of said arms,
gripping of a blank by arms 42, 43

Sequence 4:
rotation of the shaft 31 through 90° bringing the arms into starting position for sequence 1.

The times of execution are shown in the Table hereinbelow.

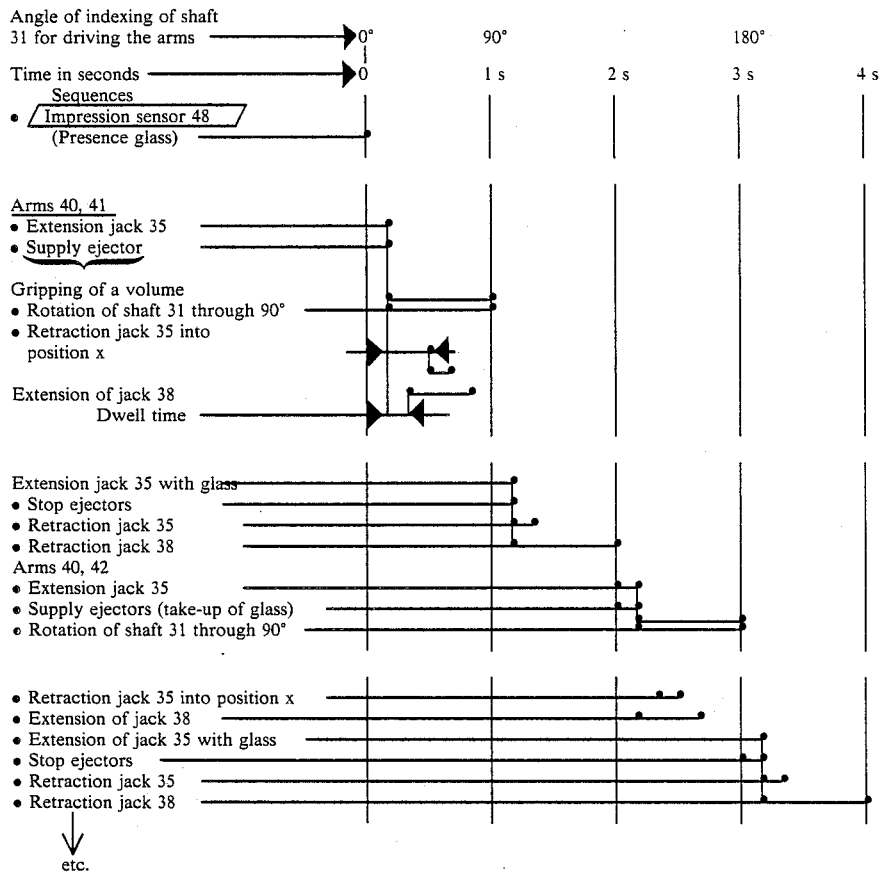

pneumatic distributors supplying the ejectors are adjustable so as to ensure correct and optimized scheduling of the sequences.

Operation as loader:

The two couples of parallel arms are applied on the same pane by passage of the arms between the belts of the conveyor as shown in FIG. 4, the largest dimension of the pane being parallel to the shaft 31.

Thus, with such a device, maximum rates of 2 seconds per cycle are attained (one blank taken every 2 seconds).

What is claimed is:

1. A device for transferring objects, particularly panes of glass, between a gripping station and a deposition station comprising:

at least one arm having at each extremity a gripping means including at least one suction cup;

means selectively evacuating the suction cups of said arm;

a rotating shaft to which said arm is linked, said arm being mounted perpendicularly to said shaft and being mounted to slide within and opening through said shaft and in a direction perpendicular to said shaft;

means for sliding said arm;

means for translating said arm and locking said arm in the extreme positions of its path of travel; and means for controlling the rotation and the position of said shaft.

2. The device for transferring objects, particularly panes of glass, of claim 1, wherein said device comprises coupled orthogonal arms.

3. The device of claim 1, including spaced parallel arms fastened together by a distance piece.

4. The device of claim 1, wherein said shaft is disposed horizontally.

5. The device of claim 1, wherein said means for sliding said arm is comprised of a large-stroke jack moving a predetermined distance.

6. The device of claim 1, including an indexer with a plurality of stations for controlling rotation of said shaft.

7. The device of claim 6, including sensors detecting the presence of objects at the gripping station, the presence of objects at the deposition station, the position of said arm after depositing an object, and the position of said indexer.

8. The device of claim 1, wherein each suction cup is mounted on a short-stroke jack.

* * * * *